(12) United States Patent
Nomiyama (10) Patent No.: US 9,804,006 B2
(45) Date of Patent: Oct. 31, 2017

(54) ANGLE SENSOR TEMPERATURE CORRECTING DEVICE

(71) Applicant: Azbil Corporation, Tokyo (JP)

(72) Inventor: Takashi Nomiyama, Tokyo (JP)

(73) Assignee: AZBIL CORPORATION, Tokyo (JP)

(*) Notice: Subject to any disclaimer, the term of this patent is extended or adjusted under 35 U.S.C. 154(b) by 227 days.

(21) Appl. No.: 14/660,277

(22) Filed: Mar. 17, 2015

(65) Prior Publication Data

US 2015/0276438 A1    Oct. 1, 2015

(30) Foreign Application Priority Data

Mar. 31, 2014    (JP) .................................. 2014-072854

(51) Int. Cl.
  *G01B 7/30*    (2006.01)
  *G01D 18/00*    (2006.01)
  (Continued)

(52) U.S. Cl.
  CPC ............. *G01D 18/00* (2013.01); *G01D 5/145* (2013.01); *G01D 5/16* (2013.01); *G01D 5/2448* (2013.01);
  (Continued)

(58) Field of Classification Search
  CPC ...... G01D 5/16; G01D 5/145; G01D 5/24452; G01D 5/2448; G01D 5/2449; G01D 18/00; F16K 37/0083
  See application file for complete search history.

(56) References Cited

U.S. PATENT DOCUMENTS 6,896,407 B2    5/2005  Nomiyama et al.
8,466,676 B2 *  6/2013  Saruki ................ G01R 33/0023
                                                        324/252
(Continued)

FOREIGN PATENT DOCUMENTS

EP    1505371 A1    2/2005
EP    1516159 B1    3/2005
(Continued)

OTHER PUBLICATIONS

Extended European Search Report dated Aug. 17, 2015 issued in corresponding European Patent Application No. 15160000.4.
(Continued)

*Primary Examiner* — G. M. Hyder
*Assistant Examiner* — Michael Harrison
(74) *Attorney, Agent, or Firm* — Oblon, McClelland, Maier & Neustadt, L.L.P.

(57) ABSTRACT

An angle sensor temperature correcting device includes: a zero correcting factor storing portion that stores, as a reference temperature bridge midpoint potential difference offset and a bridge total resistance indicating value, a difference from an actual correct value, for a relative angle between a bridge circuit and a magnetic field, for the bridge midpoint potential difference, and a value indicating the total resistance of the bridge circuit, at a reference temperature, and stores, as a zero correcting factor, a ratio of the bridge midpoint potential difference offset and the bridge total resistance indicating value at the reference temperature; and a temperature correcting portion that performs temperature correction on angle information obtained from the bridge midpoint potential difference of the bridge circuit at a given time, based on a zero correcting factor stored in the zero correcting factor storing portion.

7 Claims, 10 Drawing Sheets

(51) Int. Cl.
*G01D 5/16* (2006.01)
*G01D 5/14* (2006.01)
*G01D 5/244* (2006.01)

(52) U.S. Cl.
CPC ....... *G01D 5/2449* (2013.01); *G01D 5/24452* (2013.01)

(56) References Cited

U.S. PATENT DOCUMENTS

| | | |
|---|---|---|
| 2003/0076090 A1 | 4/2003 | Muth |
| 2003/0086470 A1* | 5/2003 | Nomiyama ......... F16K 37/0083 374/6 |

FOREIGN PATENT DOCUMENTS

| | | |
|---|---|---|
| JP | 2003-021503 | 1/2003 |
| JP | 2003-139561 | 5/2003 |
| WO | 2004/001341 A1 | 12/2003 |

OTHER PUBLICATIONS

Chinese Office Action issued in corresponding Chinese Application No. 201510121457.2.

* cited by examiner

BACKGROUND ART

FIG. 8

BACKGROUND ART

FIG. 9

BACKGROUND ART

FIG. 10

BACKGROUND ART

ANGLE SENSOR TEMPERATURE CORRECTING DEVICE

CROSS REFERENCE TO RELATED APPLICATION

This application claims priority under 35 U.S.C. §119 to Japanese Patent Application No. 2014-072854, filed on Mar. 31, 2014, the entire content of which being hereby incorporated herein by reference.

FIELD OF TECHNOLOGY

The present invention relates to a temperature correcting device for an angle sensor, well suited for use in control of a valve opening of a flow rate regulating valve.

BACKGROUND

Conventionally, in a flow rate regulating valves, the valve opening thereof is detected using an angle sensor, where the valve opening is sent to a positioner main unit, which is the valve opening controlling device, to calculate, within this positioner main unit, a process variable in accordance with the difference between a valve opening setting value, applied from the outside, and the detected valve opening, to perform adjustments automatically in accordance with the calculated process variable, to cause the valve opening of the flow rate regulating valve to match the valve opening setting value.

Figure 7:
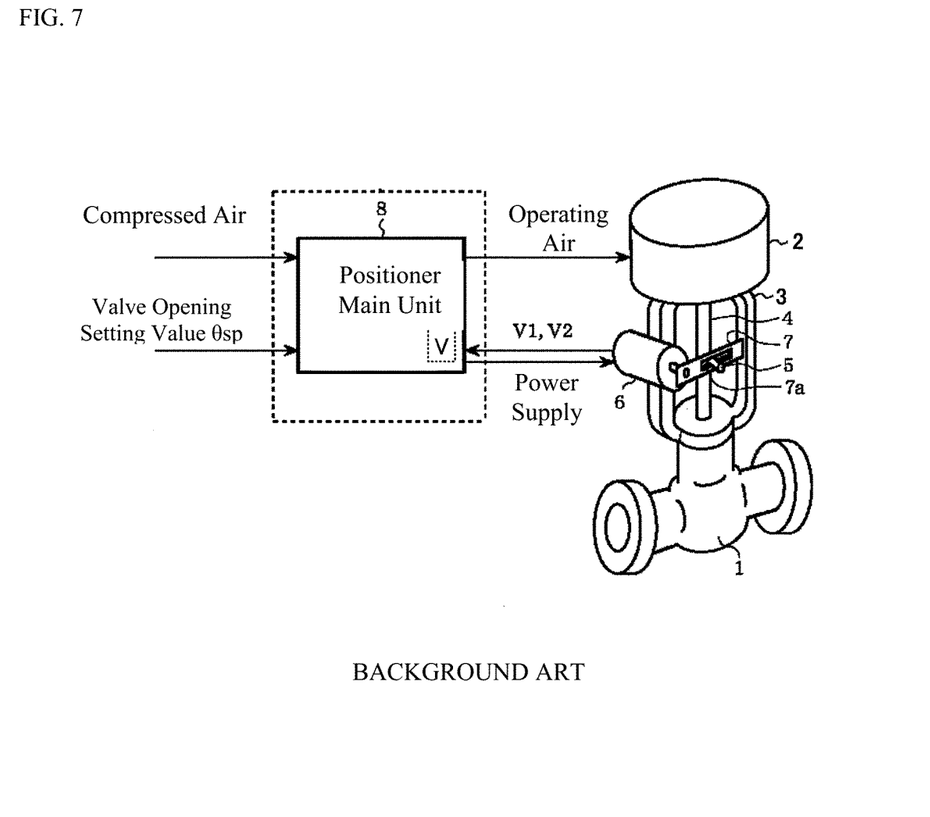
FIG. 7 is a structural diagram of a conventional flow rate regulating valve controlling system.

FIG. 7 is a structural diagram of a conventional system for controlling a flow rate regulating valve (a flow rate regulating valve controlling system), where, in this figure, 1 is the flow rate regulating valve, 2 is an operating device, 3 is a yoke for securing the operating device 2 and the flow rate regulating valve 1, 4 is a valve driving shaft, driven by the operating device 2, and 5 is a pin that is embedded protruding at a prescribed position of the valve driving shaft 4. 6 is an angle sensor (VTD) that is secured to a portion of the yoke 3, to output an opening signal in accordance with the valve positioner, that is, with the valve opening, of the flow rate regulating valve 1. This angle sensor 6 is structured from four magnetoresistive elements that are connected in a bridge, where an input voltage is applied to one of two opposing terminals, and the other set of two opposing terminals is used as output terminals.

7 is a feedback lever for inputting, into the angle sensor 6, opening information in accordance with the valve opening of the flow rate regulating valve 1, with one end thereof secured to the rotational shaft of the angle sensor 6. Moreover, a slit 7a is formed in this feedback lever 7, where the pin 5 engages slidably with this slit 7a, to convert the reciprocating motion of the valve driving shaft 4 into rotational motion.

Figure 8:
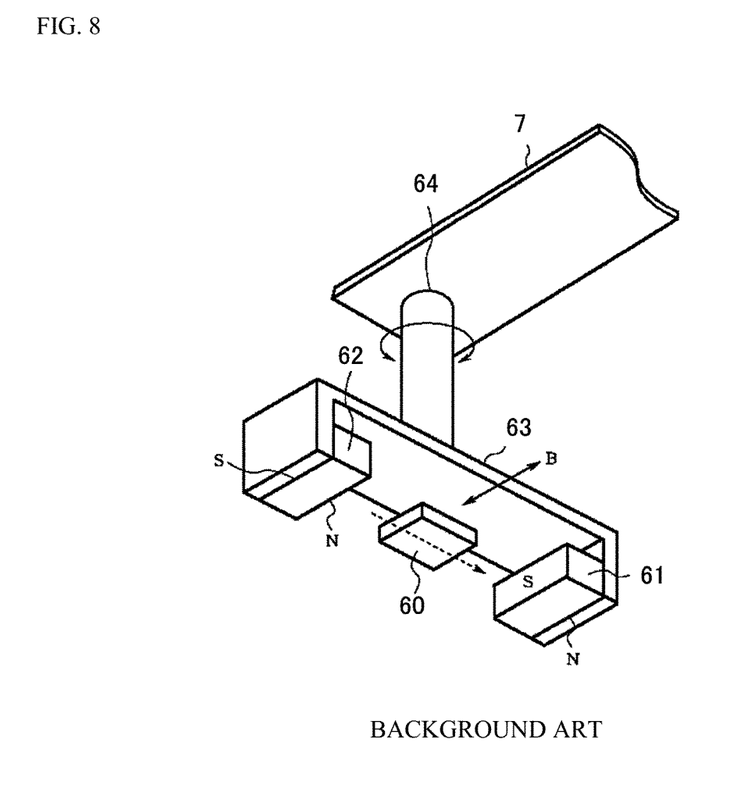
FIG. 8 is a perspective diagram illustrating the critical portions of an angle sensor wherein this flow rate regulating valve controlling system is used.

FIG. 8 is a perspective diagram illustrating the critical portions of the angle sensor 6. The angle sensor 6 is provided with a magnetism detecting element 60, secured at a prescribed location, where magnets 61 and 62 are attached, facing each other, to a magnetic circuit forming body 63, with the magnetism detecting element 60 interposed therebetween. The center of the magnetic circuit forming body 63 is secured to one end of a rotational shaft 64. The other end of the rotational shaft 64 is secured to the feedback lever 7. When the rotational shaft 64 rotates in accordance with the shifting of the feedback lever 7, the magnets 61 and 62, together with the magnetic circuit forming body 63, rotate surrounding the magnetism detecting element 60, thereby changing the direction of the magnetic field that acts on the magnetism detecting element 60, thereby changing the value of the resistance of the magnetism detecting element 60.

Figure 9:
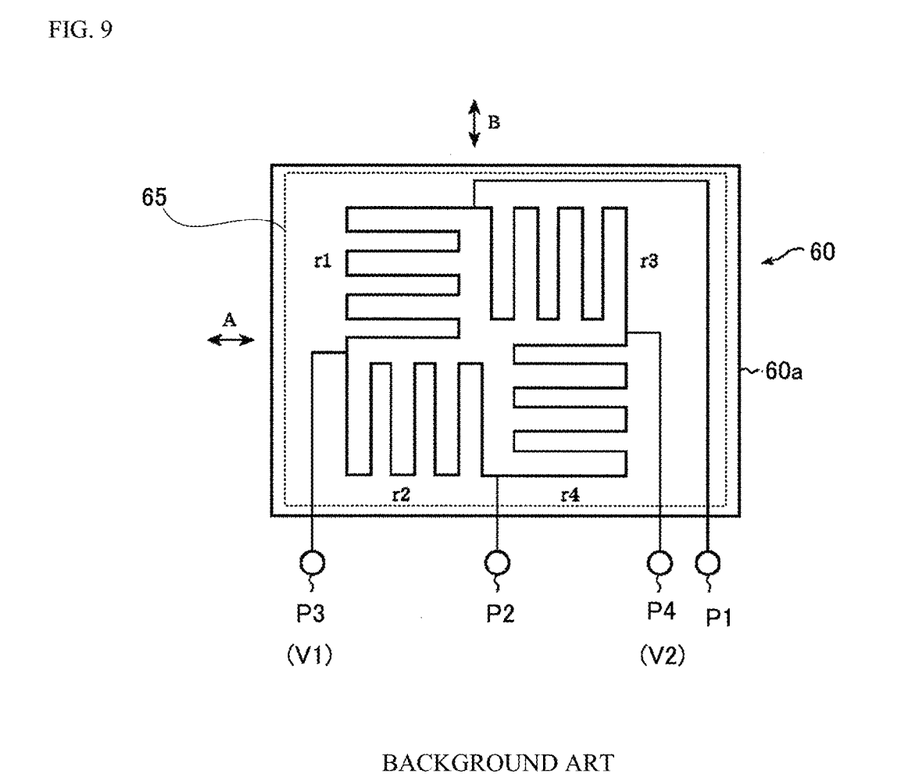
FIG. 9 is a plan view diagram illustrating the structure of a magnetism detecting element and an angle sensor wherein this flow rate regulating valve controlling system is used.

FIG. 9 is a plan view diagram illustrating a structure for the magnetism detecting element 60. In this magnetism detecting element 60, four magnetoresistive elements (AMR elements ("anisotropic magnetoresistive" devices)) r1, r2, r3, and r4, which are shaped as zigzags, are formed on a substrate 60a with point symmetry so that the zigzag directions thereof are mutually perpendicular.

In this magnetism detecting element 60, when the magnetic field acts, for example, in the direction of arrow A, shown in FIG. 9, then the resistance values of the magnetoresistive elements r1 and r4, which are parallel thereto, will go to maximum values, and the resistance values of the magnetoresistive elements r2 and r3, which are perpendicular thereto, will go to minimum values. Moreover, when the magnetic field acts in the direction of the arrow B, illustrated in FIG. 9, the resistance values of the magnetoresistive elements r1 and r4 will go to minimum values, and the resistance values of the magnetoresistive elements r2 and r3 will go to maximum values.

In the magnetism detecting element 60, not only is the bridge circuit 65 structured through the four magnetoresistive elements r1, r2, r3, and r4 that are connected in a bridge, but also bridge midpoint electrical potentials V1 and V2 are obtained from the output terminals P3 and P4 are produced through the application of a constant current across the power supply terminals P1 and P2 of this bridge circuit 65.

In FIG. 7, 8 is the positioner main unit that is the valve opening controlling device. In this positioner main unit 8, compressed air is fed in from the outside, and a valve opening setting value θsp is sent through communication from a controller (not shown) that is located in a remote location. Moreover, the positioner main unit 8 reads in, as an opening signal that is in accordance with the current valve opening value θpv of the flow rate regulating valve 1, a difference V between the bridge midpoint electrical potentials V1 and V2 from the output terminals P3 and P4 (the bridge midpoint potential difference), along with performing the supply of electric power across the power supply terminals P1 and P2 of the angle sensor 6.

The positioner main unit 8 compares the current valve opening θpv of the flow rate regulating valve 1, read in by the angle sensor 6, to the valve opening setting value θsp, applied from the outside, to send, to the operating device 2, control air, generated from compressed air, in accordance with the comparison result, so that the valve driving shaft 4 is driven by the operating device 2, to perform control so that the valve position of the flow rate regulating valve 1 (the current valve opening value θpv) will match the valve opening setting value θsp.

In the flow rate regulating valve controlling system, if there is a large difference between the temperature of the fluid that flows through the flow rate regulating valve 1 and the temperature of the room, the temperature of the angle sensor 6 will be affected, through thermal conduction, by the flow rate regulating valve 1 via the yoke 3, producing a large difference from room temperature, producing variation in the output (the bridge midpoint potential difference V) of the angle sensor 6 through changes in the temperature characteristics of the magnetoresistive elements r1 through r4 that structure the bridge circuit 65.

Because of this, in the flow rate regulating valve controlling system set forth in, for example, Japanese Unexamined Patent Application Publication No. 2003-139561 ("the JP '561"), only the component that is dependent on temperature is detected based on the bridge midpoint electrical potentials V1 and V2 when a constant current is supplied to the bridge circuit 65 of the angle sensor 6, where the temperature of the angle sensor 6 (the ambient temperature) is acquired from the detected temperature-dependent component, where correction information corresponding to the temperature that has been acquired is used in performing temperature correction on the opening information (the angle information) obtained from the bridge midpoint potential difference V.

Specifically, in the JP '561, an addition result V1+V2 that is independent of the angle θ is calculated through adding the bridge midpoint electrical potentials V1 and V2 (the bridge midpoint electrical potential sum), to calculate the temperature of the bridge circuit 65 of the angle sensor 6 based on this addition result V1+V2 that is not dependent on the angle θ, to determine a correction value corresponding to the calculated temperature. This correction value is used in correcting when calculating the valve opening value θpv of the flow rate regulating valve 1 at the current time, to cancel in relation to the valve opening, produced depending on the temperature of the angle sensor 6.

Moreover, for example, Japanese Unexamined Patent Application Publication No. 2003-21503 ("the JP '503") discloses a torque tube-type measuring instrument that uses an angle sensor. When the technology used in this torque tube-type measuring instrument is applied to the flow rate regulating valve controlling system described above, the total resistance of the magnetism detecting element 60 is detected based on the voltage across the power supply terminals P1 and P2 (the bridge power supply terminal voltage) when a constant current is applied to the bridge circuit 65 of the angle sensor 6, where the temperature of the angle sensor 6 is acquired based on the detected total resistance of the magnetism detecting element 60, where correction information corresponding to this acquired temperature is used to perform temperature correction on the opening information (the angle information) obtained from the bridge midpoint potential difference V.

Specifically, in the JP '503, a database for storing the empirically-derived relationship between the total resistance R of the magnetism detecting element 60 and the temperature is provided, where temperature data corresponding to the detected total resistance R of the magnetism detecting element 60 is read out from the database, and correction information that has been read out, corresponding to the temperature data, is used.

In the flow rate regulating valve controlling system set forth in the JP '561, the sum of the bridge midpoint electrical potentials V1 and V2 (the bridge midpoint electrical potential sum) from the angle sensor is used to detect the temperature of the angle sensor, so that, in the flow rate regulating valve controlling system to which the technology set forth in the JP '503 is applied, the voltage across the bridge power supply terminals of the angle sensor is used to detect the temperature of the angle sensor, that is, the temperature of the angle sensor is detected using the bridge midpoint electrical potential sum and the bridge power supply terminal voltage, which indicates the total resistance of the bridge circuit (the bridge total resistance), and thus there is no need to provide a separate temperature sensor, which has the benefit of enabling a simplification and a cost reduction in the structure and operability through reducing the number of components used.

Figure 10:
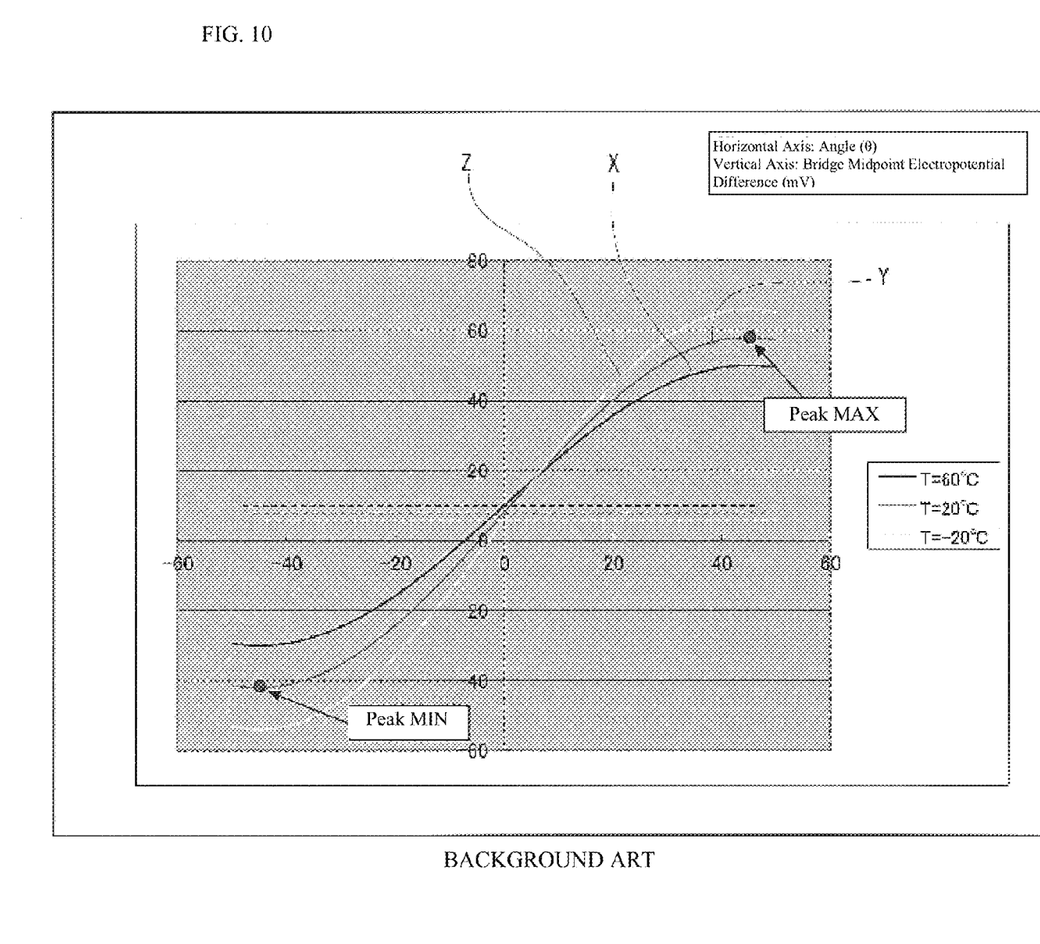
FIG. 10 is a diagram illustrating the change in the output of the angle sensor due to the effects of temperature.

However, the change in output of the angle sensor through the effects of temperature combines a zero point shift and a span shift. An illustrative example of a change in output of the angle sensor due to the effects of temperature is given in FIG. 10. In FIG. 10, the horizontal shaft is the angle θ(°), and the vertical shaft is the bridge midpoint potential difference V (mV), where X shows the case of an ambient temperature of 60° C., Y shows the case of an ambient temperature of 20° C., and Z shows the case of an ambient temperature of −20° C.

As illustrated in FIG. 10, the bridge midpoint potential difference V is scaled by the temperature (that is, the span is changed by the temperature), and also undergoes translational movement (that is, there is also a change in the zero point). All sensors that have bridge structures have such characteristics, where this is true also for a pressure sensor that is of a piezo type. Typically, the zero point shift and the span shift have different temperature characteristics, and so even though one may refer to simply "temperature correction," it is actually necessary to model the characteristics of each independently, and to use respective correction calculation formulas.

Note that in the JP '561 and the JP '503, one may consider recording in advance sets of input angles, total resistances, and outputs (historic records), and interpolating points in between. In such a case there is no need to perform modeling; however there is a drawback in manufacturing in that this requires expensive equipment and an extensive amount of time to produce these "historic records."

Moreover, in the JP '561 and the JP '503, one may consider the use of a calculation formula that models the span alone. In this case, only the span will be corrected, and the effects of the zero point shift, of course, will remain. Because of this, one may consider demanding, of the sensor vendor, a purchasing specification having favorable zero point characteristics to begin with (eliminating the need to consider the temperature shifts in the vicinity of the zero point to begin with), but "the "favorable characteristics" ultimately means "selecting through screening," and because of this the manufacturability (the yield) will be poor, causing the cost of the angle sensor to be high. If zero point correction is possible, then excessive screening is unnecessary, enabling a reduction in the cost of the angle sensors.

The present invention was created in order to solve such issues, and an aspect thereof is to provide an angle sensor temperature correcting device able to provide a superior correction result at a low cost through eliminating the need for expensive equipment in creating the historic records and eliminating the need for excessive screening.

SUMMARY

In order to achieve such an aspect, the present invention is an angle sensor temperature correcting device, including a bridge circuit that includes four magnetoresistive elements, connected in a bridge connection, and receives a supply of a constant current across power supply terminals, and a magnetic field generating portion that generates a magnetic field that acts on this bridge circuit, for performing temperature correction on angle information from an angle sensor that outputs a bridge midpoint potential difference for the bridge circuit as relative angle information between the bridge circuit and the magnetic field. The angle sensor temperature correcting device includes: a zero correcting factor storing portion that stores, at a reference temperature, as bridge midpoint potential difference offset a difference from an actual value to a correct value for a relative angle between the bridge circuit and the magnetic field of the bridge midpoint potential difference, and as a bridge total resistance indicating value a value indicating the total resistance of the bridge circuit at the reference temperature, and stores, as a zero correcting factor, a ratio of the bridge midpoint potential difference offset and the bridge total resistance indicating value at the reference temperature; and a temperature correcting portion that performs temperature correction on angle information obtained from the bridge midpoint potential difference of the bridge circuit at a given time, based on a zero correcting factor stored in the zero correcting factor storing portion.

In the present invention, at the time of factory shipping, or the like, a bridge midpoint potential difference and a bridge total resistance indicating value at a reference temperature when the angle of the bridge circuit relative to the magnetic field is 0° are stored as a bridge midpoint potential difference offset (Cref) and a bridge total resistance indicating value (Sref), and a ratio of the bridge midpoint potential difference offset (Cref) to the bridge total resistance indicating value (Sref) at the reference temperature (the ratio $\alpha$=Cref/Sref) is stored as a zero correcting factor. Given this, at the time of actual use, the angle information obtained from the bridge midpoint potential difference (Vt) of the bridge circuit at the current time is subject to temperature correction based on the zero correcting factor ($\alpha$).

In the temperature correcting portion according to the present invention may be equipped further with a span correcting factor storing portion wherein the difference between the maximum value and the minimum value for the bridge midpoint potential difference for the bridge circuit at the reference temperature, obtained by rotating the magnetic fields that acts on the bridge circuit is used as the span (Wref) at the reference temperature, and factors calculated from the this span (Wref) at the reference temperature and the bridge total resistance indicating value (Sref) at the reference temperature (for example, a slope a (a constant value) and an intercept b) of a straight line that defines the relationship between the total resistance and the span in the bridge circuit, for example) are stored as span correcting factors, and temperature correction may be performed, on the angle information obtained from the bridge midpoint potential difference of the bridge circuit at the current time, based on the zero correcting factor ($\alpha$) that is stored in the zero correcting factor storing portion and on the span correcting factors (a and b) that are stored in the span correcting factor storing portion.

A temperature-corrected bridge midpoint potential difference offset (Ct) at the current time may be calculated based on the bridge total resistance indicating value (St) of the bridge circuit at the current time and the zero correcting coefficient ($\alpha$) that has been stored, and a temperature-corrected span (Wt) for the current time may be calculated based on the bridge total resistance indicating value (St) at the current time for the bridge circuit and the span correcting factors (a and b) that are stored, to perform temperature correction of the angle information obtained from the bridge midpoint potential difference (Vt) at the current time for the bridge circuit based on the temperature-corrected bridge midpoint potential difference offset (Ct) and span (Wt) at the current time (claim 3).

In the present invention, the calculation of the bridge midpoint potential difference offset (Ct) is through calculating a temperature-corrected bridge midpoint potential difference offset (Ct) from the bridge total resistance indicating value (St) for the bridge circuit at the current time through calculating and storing a zero correcting factor ($\alpha$) that is unique to the angle sensor, based on the knowledge that the temperature characteristics of the zero point shift are essentially identical to the temperature characteristics of the bridge total resistance (R). As a result, the present invention enables the temperature correction of the angle information, obtained from the bridge midpoint potential difference (Vt) for the bridge circuit at the current time using the temperature-corrected bridge midpoint potential difference offset (Ct), without going through the temperature.

Moreover, in the present invention, the calculation of the temperature-corrected span (Wt) is through calculating a temperature-corrected span (Wt) from the bridge total resistance indicating value (St) for the bridge circuit at the current time through calculating and storing span correcting factors (a and b) that are unique to the angle sensor, based on the knowledge that the span (W) and the bridge total resistance (R) have essentially a linear relationship, mediated by the temperature (T). Because of this, the present invention enables temperature correction of the angle information to be obtained from the bridge midpoint potential difference (Vt) of the bridge circuit at the current time, without going through the temperature.

Note that in the present invention all that is necessary is for at least the offset to undergo temperature correction, and temperature correction of the span is not essential. Moreover, in the present invention, the angle sensor may be such that the bridge midpoint electrical potential difference for the bridge circuit may be outputted as a combination of two bridge midpoint electrical potentials, or may be the bridge midpoint potential difference itself.

Moreover, in the present invention the bridge total resistance indicating value may be the voltage across the power supply terminals of the bridge circuit, or may be a bridge midpoint electrical electropotential sum for the bridge circuit. Furthermore, if the bridge total resistance can be known directly, this bridge total resistance itself may be used as the bridge total resistance indicating value.

Moreover, in the present invention, the difference from the actual value to the correct value for the bridge midpoint potential difference at the reference temperature, for a relative angle between the bridge circuit and the magnetic field, may use a value that is obtained by the use of the maximum value and the minimum value for the bridge midpoint potential difference at the reference temperature, obtained through rotating the magnetic field that acts on the bridge circuit (a value wherein the sum of the maximum value and the minimum value is divided by 2), or may use the bridge midpoint potential difference for the bridge circuit when not in a magnetic field.

In the present invention, a the difference from the actual value to the correct value of the bridge midpoint potential difference, for a relative angle between the bridge circuit and the magnetic field, and a value indicating the total resistance of the bridge circuit, at the reference temperature are used as a bridge midpoint potential difference offset and bridge total resistance indicating value at the reference temperature, and the ratio of the bridge midpoint potential difference offset in the bridge total resistance indicating value at the reference temperature is stored as a zero correcting factor, where temperature correction is performed, based on the stored zero correcting factor, on the angle information obtained from the bridge midpoint potential difference for the bridge circuit at the current time, thus enabling the angle information obtained from the bridge midpoint potential difference in the bridge circuit at the current time to be corrected for temperature, without going through temperature, thus producing the superior effects of eliminating the need for expensive equipment for a historical record and eliminating the need for excessive screening, enabling superior correction results at a low cost.

Moreover, the present invention is further provided with span correcting factor storing portion for using, as a span, a difference between a maximum value and a minimum value for the bridge midpoint potential difference of the bridge circuit at the reference temperature, obtained by rotating a magnetic field that acts on the bridge circuit, and for storing, as span correcting factors, factors calculated from the span at the reference temperature and the bridge total resistance indicating value at the reference temperature, where performing temperature correction, based on the zero correcting factor that is stored in the zero correcting factor storing portion and the span correcting factors that are stored in the span correcting factor storing portion, the angle information obtained from the bridge midpoint potential difference of the bridge circuit at the current time enables even better correcting results through performing temperature correction on both the zero point shift and the span shift.

DETAILED DESCRIPTION

Examples according to the present disclosure will be explained below in detail, based on the drawings.

Figure 1:
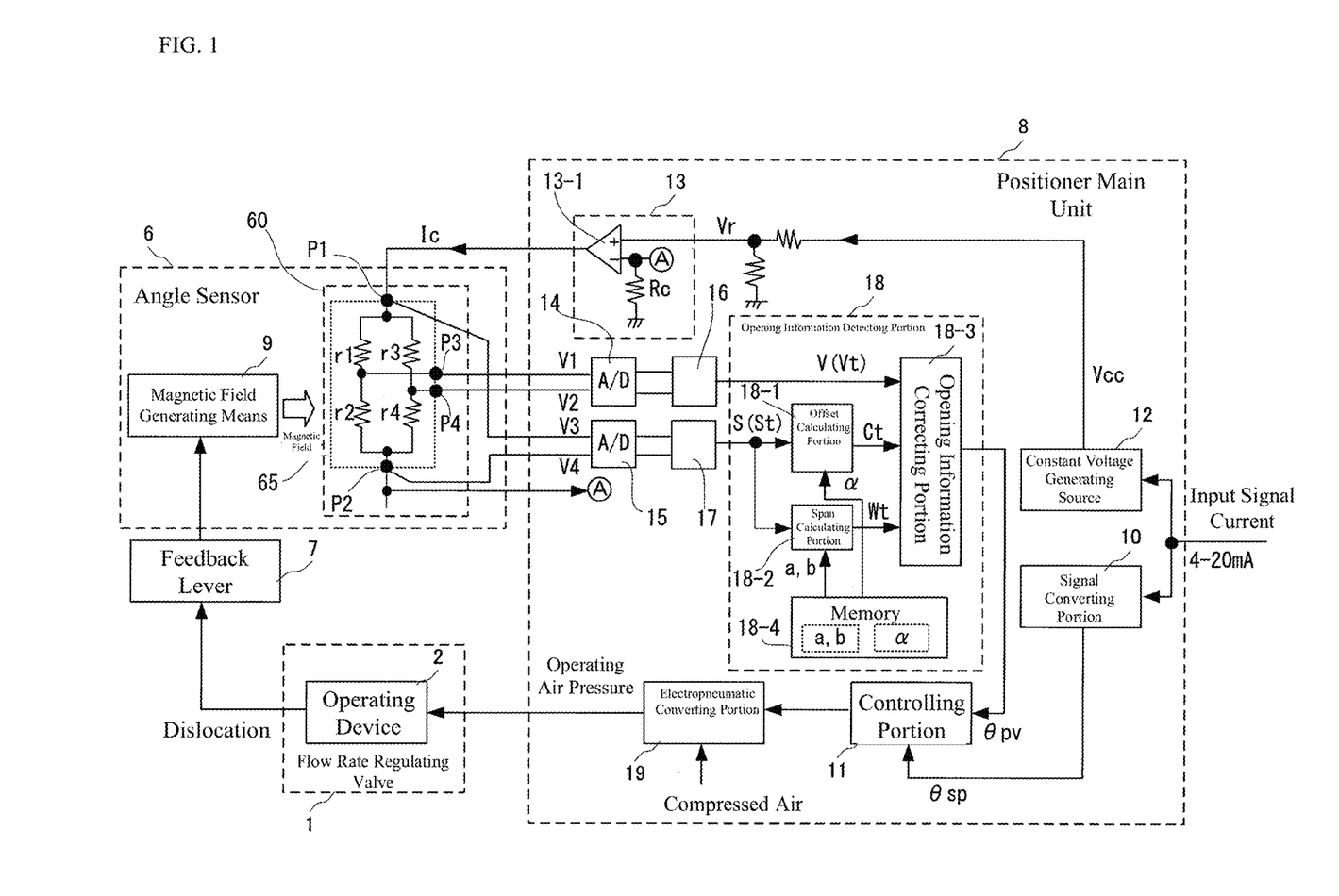
FIG. 1 is a structural diagram of a flow rate regulating valve controlling system including a temperature correcting device for an angle sensor, according to the present invention.

FIG. 1 is a structural diagram of a flow rate regulating valve controlling system including a temperature correcting device for an angle sensor, according to the present invention. In this figure, codes that are identical to those in FIG. 7 through FIG. 9 indicate structural elements that are identical or similar to the structural elements explained in reference to FIG. 7 through FIG. 9, so explanations thereof will be omitted.

In FIG. 1, 9 is a magnetic field generating portion for generating a magnetic field that acts on a magnetism detecting element 60, structured from the magnets 61 and 62, the magnetic circuit forming body 63, and the rotational shaft 64 illustrated in FIG. 8. The angle sensor 6 uses the magnetic field generating portion 9 and the magnetism detecting element 60 as the primary structural elements thereof. In the magnetism detecting element 60, four magnetoresistive elements r1, r2, r3, and r4 are connected in a bridge to structure the bridge circuit 65.

In this angle sensor 6, the resistance values of the magnetoresistive elements r1, r2, r3, and r4 that are bridge-connected vary in accordance with the angle with which the magnetic field generated by the magnetic field generating portion 9 crosses the magnetism detecting element 60, and the bridge midpoint electric potentials V1 and V2 at the time are read out from the output terminals P3 and P4. Moreover, a constant current Ic is supplied across the power supply terminals P1 and P2.

The positioner main unit 8 both receives a supply of electric power from the outside, and communicates with the outside, through a 4-20 mA communication line. The positioner main unit 8 is provided with a signal converting portion 10, a controlling portion 11, a constant voltage generating source 12, a constant current supplying portion 13, A/D converters 14 and 15, subtracting portions 16 and 17, an opening information detecting portion 18, and an electropneumatic converting portion 19.

The signal converting portion 10 reads out, from the 4-20 mA input signal, a setting value that is superimposed on this input signal. In FIG. 1, a valve opening setting value θsp is read out as the setting value from the 4-20 mA input signal and provided to the controlling portion 11. Moreover, the constant voltage generating source 12 produces a power supply with a constant voltage Vcc from the 4-20 mA input signal. Although omitted from the drawings, the electrical structure within the positioner main unit 8 operates based on the electric power supplied from the constant voltage generating source 12.

The constant current supplying portion 13 supplies a constant current Ic across the power supply terminals P1 and P2 of the bridge circuit 65 in the angle sensor 6. Specifically, a structure is used wherein the output of a differential amplifier 13-1 is applied to the power supply terminal P1 of the bridge circuit 65, where the current that flows in the output line of the bridge circuit 65 is fed back to the inverted input side of the differential amplifier 13-1, and also a reference voltage Vr is inputted into the non-inverted side of the differential amplifier 13-1.

In the constant current supplying portion 13, the electric current Ic flows through the bridge circuit 65 and a resistor Rc, and thus the electrical potential at the contact point A between the bridge circuit 65 and the resistor Rc (the inverted input into the differential amplifier 13-1) is Rc·Ic. The differential amplifier 13-1 adjusts the output so that the electrical potential at the contact point A will be maintained at the voltage Vr, and thus Vr=Rc·Ic will be satisfied. Because Vr and Rc are both constants, Ic will also be a constant.

The A/D converter 14 converts into digital signals the bridge midpoint electrical potentials V1 and V2 that are outputted as analog signals from the output terminals P3 and P4 of the bridge circuit 65. The A/D converter 15 converts into digital signals the electrical potentials V3 and V4 that are produced as analog signals at the power supply terminals P1 and P2 of the bridge circuit 65. The subtracting portion 16 calculates, as the bridge midpoint potential difference V, the difference between the bridge midpoint electrical potentials V1 and V2 that have been converted into digital signals by the A/D converter 14. The subtracting portion 17 calculates, as the voltage S across the bridge power supply terminals, the difference between the electrical potentials V3 and V4 that have been converted into digital signals by the A/D converter 15.

The opening information detecting portion 18 inputs the bridge midpoint potential difference V from the subtracting portion 16 and the voltage S across the bridge power supply terminals, from the subtracting portion 17, to detect the valve position of the flow rate regulating valve 1 (the current valve opening value θpv). The opening information detecting portion 18 is provided with an offset calculating portion 18-1, a span calculating portion 18-2, and an opening information correcting portion 18-3, and a memory 18-4. A temperature correcting device for the angle sensor according to the present invention is included in this opening information detecting portion 18.

The controlling portion 11 calculates, and outputs as a control signal, a process variable for the valve position of the flow rate regulating valve 1 based on the valve position of the flow rate regulating valve 1 detected by the opening information detecting portion 18 (the current valve opening value θpv) and the valve position of the flow rate regulating valve 1 applied by the external controller (the valve opening setting value θsp). An electropneumatic converting portion 19 controls a nozzle/flapper mechanism based on the control signal from the controlling portion 11, to generate, and supply to the operating device 2, operating air from the compressed air.

Note that in the present example, the controlling portion 11, the subtracting portions 16 and 17, and the opening information detecting portion 18 are all achieved through a program that runs on a CPU.

Peak Writing (Executed in Advance at a Reference Temperature)

In this flow rate regulating valve controlling system, when a positioner main unit 8 is shipped in combination with an angle sensor 6, an adjusting operation, known as "peak writing," is performed in advance. This peak writing is performed through slowly rotating the rotational shaft 64 of the angle sensor 6 in a reference temperature environment (at, for example, 25° C.). The adjusting process at the time of peak writing is illustrated in FIG. 2.

Figure 2:
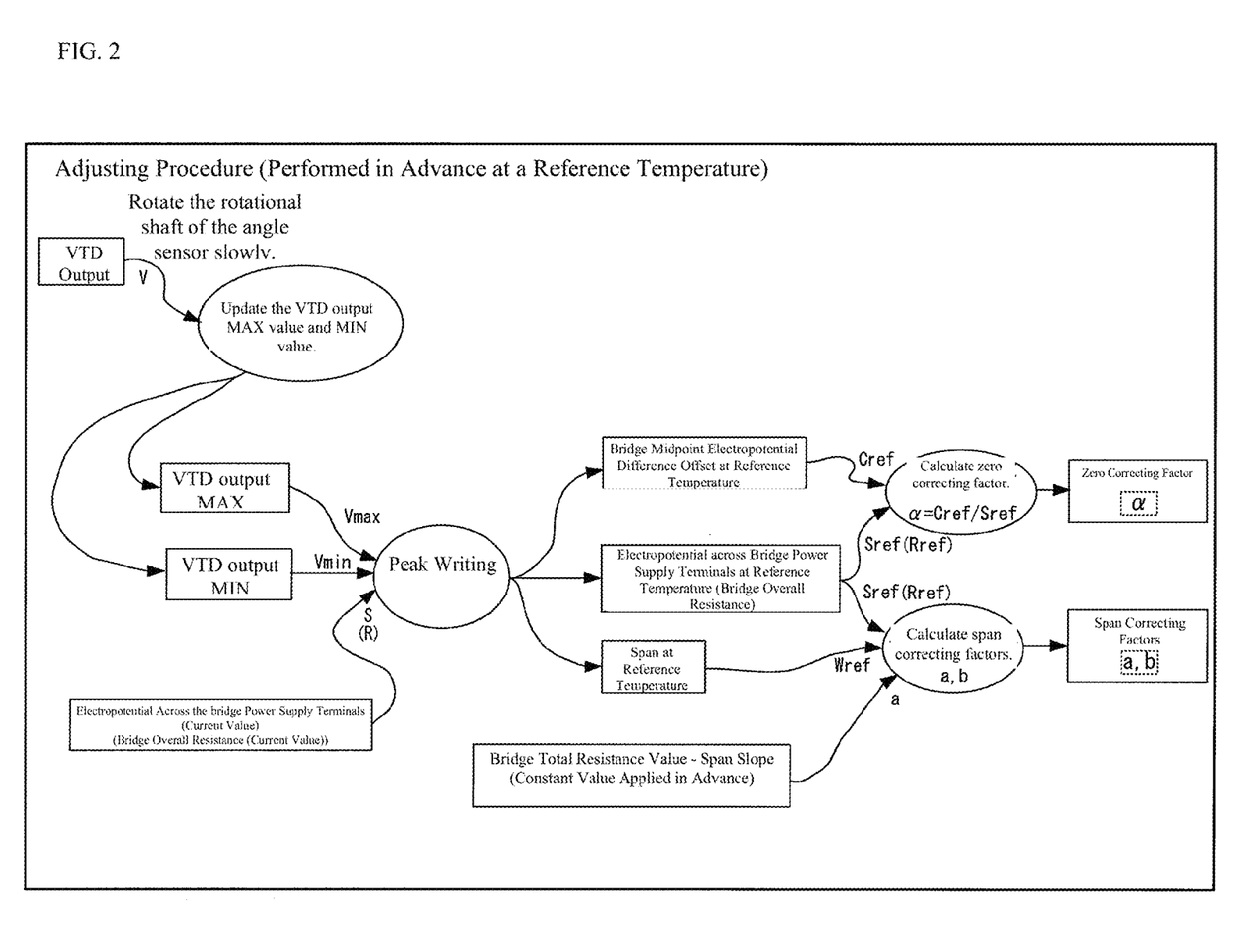
FIG. 2 is a diagram illustrating the adjusting process at the time of peak writing.
Figure 3:
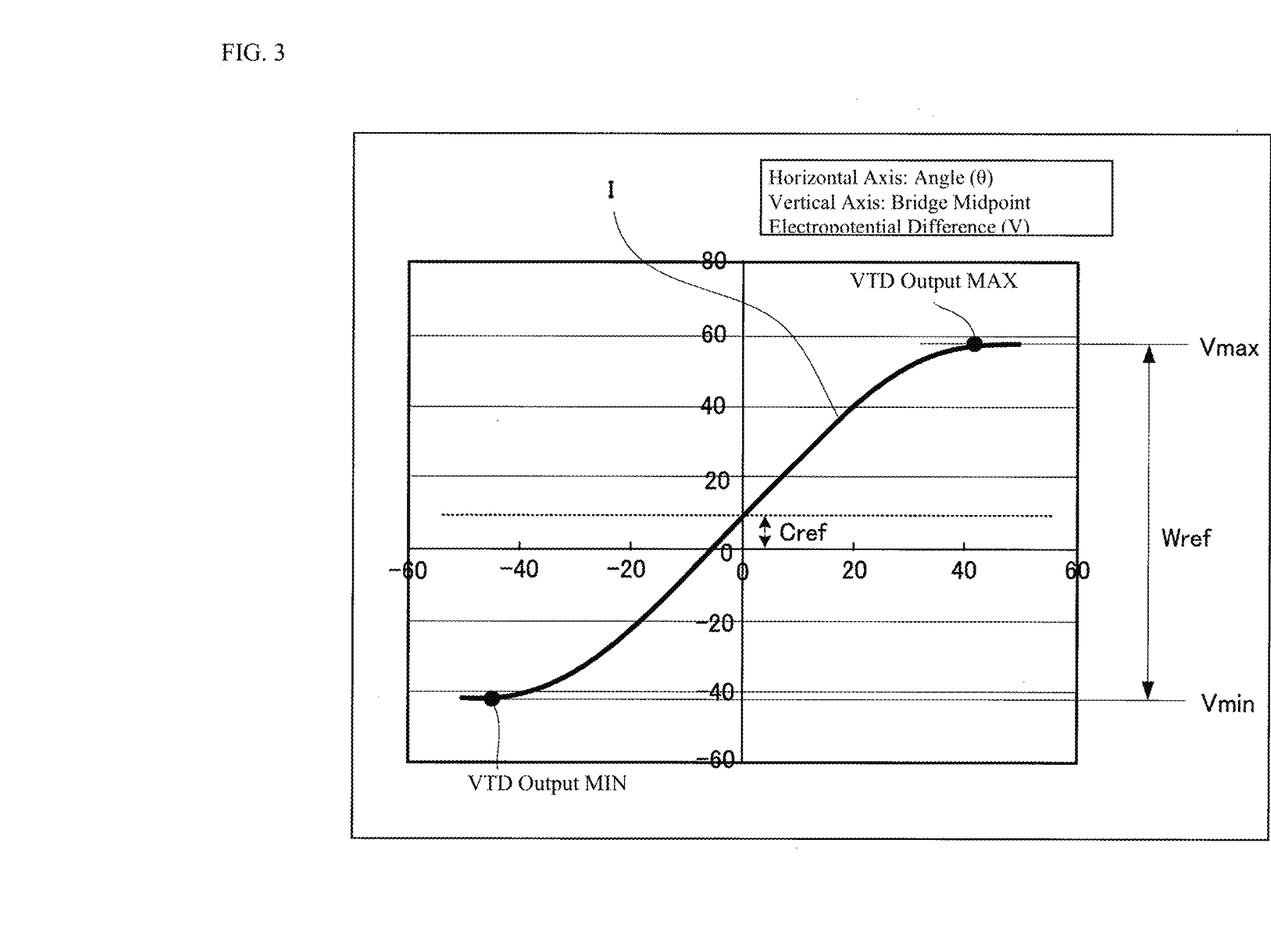
FIG. 3 is a diagram illustrating the relationship between the bridge midpoint potential difference Vmax, Vmin, and the angle θ recorded at the time of peak writing.
Figure 4:
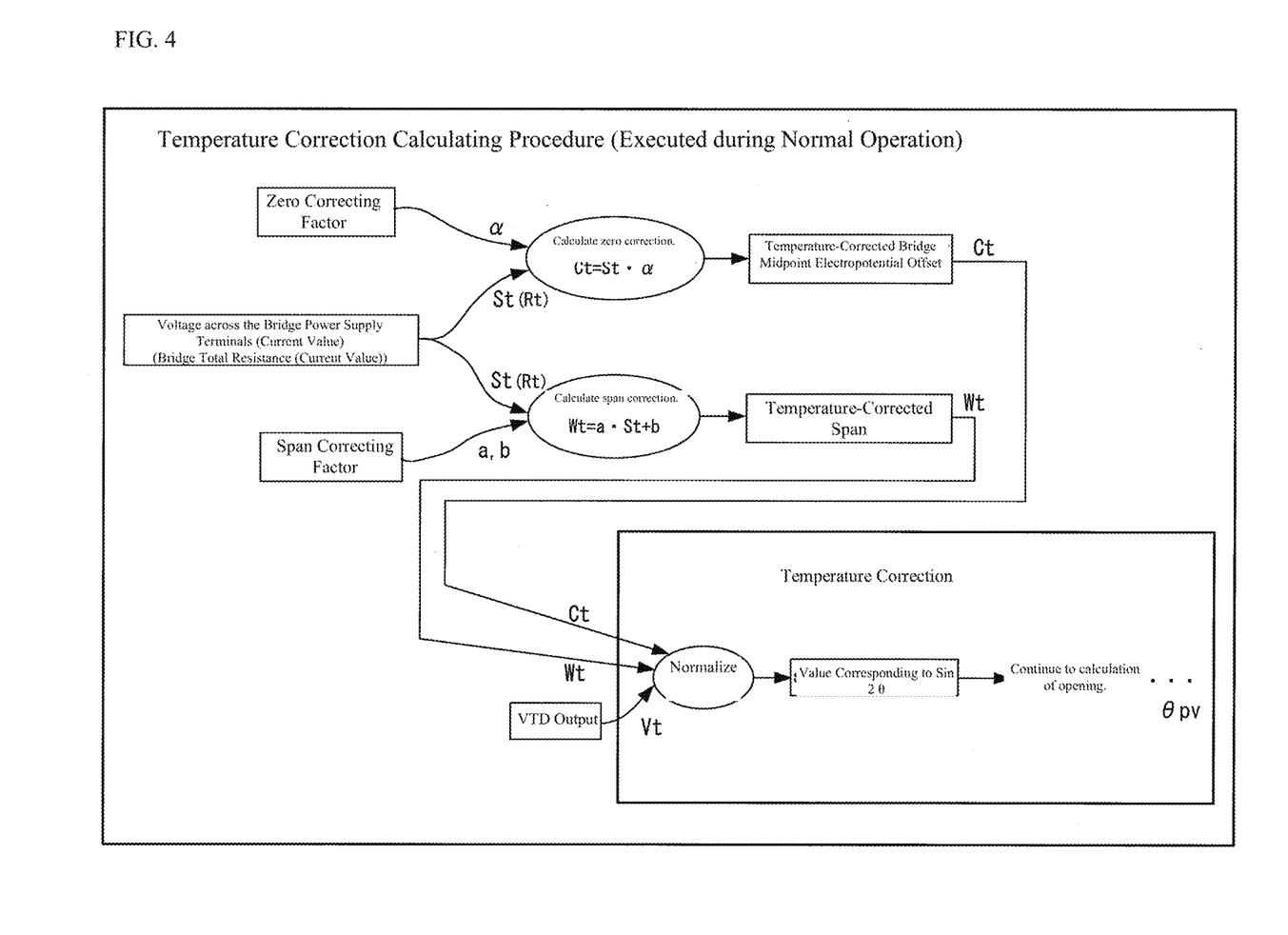
FIG. 4 is a diagram illustrating the temperature correction calculating process.

In FIG. 2, the VTD output indicates the bridge midpoint potential difference V, where the values for the maximum value Vmax (the VTD output maximum) and the minimum value Vmin (the VTD output minimum) for the bridge midpoint potential difference V are obtained while rotating the rotational shaft 64 of the angle sensor 6 slowly, that is, while varying slowly the angle θ of the rotational shaft 64 (referencing FIG. 3). Moreover, values are obtained also for the voltages S between the bridge power supply terminals together with the values for the maximum value Vmax and the minimum value Vmin of the bridge midpoint potential difference V.

Note that the voltages S between the bridge power supply terminals are obtained as values (bridge total resistance indicating values) that indicate the total resistance (the bridge total of resistance) R of the bridge circuit 65, given that a constant current Ic flows across the power supply terminals P1 and P2 of the bridge circuit 65.

Moreover, a bridge midpoint potential difference offset Cref at the reference temperature is obtained through dividing by 2 the sum of the maximum value Vmax and the minimum value Vmin of the bridge midpoint potential difference V obtained through this peak writing. Moreover, the difference between the maximum value Vmax and the minimum value Vmin is calculated as the span Wref at the reference temperature. Moreover, the voltage S across the bridge power supply terminals that is obtained together with the maximum value Vmax and the minimum value Vmin for the bridge midpoint potential difference V is calculated as the voltage Sref across the bridge power supply terminals at the reference temperature (a value indicating the bridge total resistances Rref at the reference temperature). Note that because the voltage S across the bridge power supply terminals is independent of the angle θ, the voltage S across the bridge power supply terminals may be at any time at the time of peak writing. Moreover, while in this example the bridge midpoint potential difference offset Cref at the reference temperature is calculated using the sum of the maximum value Vmax and the minimum value Vmin of the bridge midpoint potential difference V, the bridge midpoint potential difference V when not in a magnetic field, at the reference temperature, may be used instead for the bridge midpoint potential difference offset Cref.

Given this, a ratio α of the bridge midpoint potential difference offset Cref at the reference temperature and the voltage Sref between the bridge power supply terminals at the reference temperature (that is α=Cref/Sref) is calculated, and this ratio α is stored in a memory 18-4 as a zero correcting factor. Moreover, a factor that is calculated from the span Wref at the reference temperature and the voltage Sref between the bridge power supply terminals at the reference temperature is stored as a span correcting factor in the memory 18-4. Note that while in this example factors a and b are stored as span correcting factors, the factor a may be applied as a constant value instead. Factors a and b will be described below.

Temperature Correction at the Time of Actual Use (Execution During Normal Operation)

Figure 5:
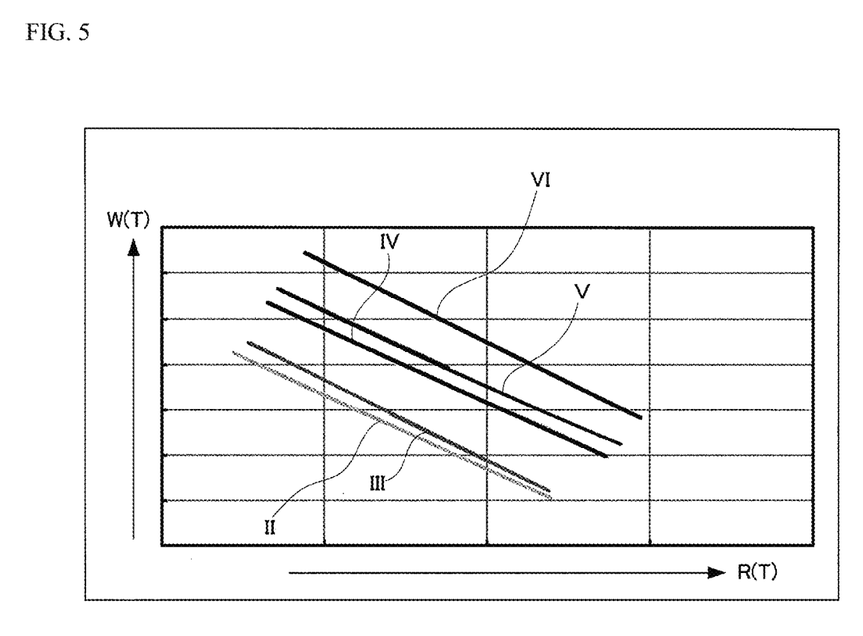
FIG. 5 is a diagram illustrating the relationship between the bridge total resistance R and the span W for each individual unit at different temperatures.

In this flow rate regulating valve controlling system, when a positioner main unit 8 and an angle sensor 6 are combined into a flow rate regulating valve 1 and used, the opening information obtained from the current bridge midpoint potential difference V of the bridge circuit 65 is subjected to temperature correction, in the opening information detecting portion 18, based on the zero correcting factor a and the span correcting factors a and b, which are stored in the memory 18-4. FIG. 5 illustrates the temperature correction calculating process in the opening information detecting portion 18. This temperature correction calculating process is performed during normal operation.

Calculating the Zero Correction

In the opening information detecting portion 18, the offset calculating portion 18-1 inputs the current voltage S (St) across the bridge power supply terminals from the subtracting portion 17, and multiplies this inputted current voltage St across the bridge power supply terminals by the zero correcting factor α (α=Cref/Sref) that is stored in the memory 18-4, to thereby calculate the temperature-corrected bridge midpoint potential difference offset Ct (Ct=St·α) at the current time.

The calculation of the bridge midpoint potential difference offset Ct, corrected for temperature, in this offset calculating portion 18-1 is based on the knowledge that the temperature characteristics for the zero point shift appear as essentially identical to the temperature characteristics of the bridge total resistance R. That is, although the detailed process is omitted, the inventor in the present application, through repeated experimentation, and the like, discovered that the temperature characteristics of the zero point shift appear as essentially identical to the temperature characteristics of the bridge total resistance R. Given this, it was derived, from this knowledge, that, as described below, the bridge midpoint potential difference offset Ct that is corrected for the current temperature can be calculated as Ct=St·α.

The voltage S across the bridge power supply terminals at the time of peak writing is defined as Sref, and the bridge midpoint potential difference offset is defined as Cref, and the ambient temperature is defined as tpeak. Moreover, the voltage across the bridge power supply terminals corresponding to 25° C. is defined as S25, the bridge midpoint potential difference offset corresponding to 25° C. is defined as C25, and the temperature factor based on these at the 25° C. reference is defined as k (where, ideally, both have identical values).

The voltage St across the bridge power supply terminals is measured at the current temperature at t (which itself is unmeasurable), to calculate a temperature-corrected bridge midpoint potential difference offset Ct:

$$S\text{ref}=(1+(t\text{peak}-25)\cdot k)\cdot S25 \quad (1)$$

$$C\text{ref}=(1+(t\text{peak}-25)\cdot k)\cdot C25 \quad (2)$$

$$St=(1+(t-25)\cdot k)\cdot S25 \quad (3)$$

$$Ct=(1+(t-25)\cdot k)\cdot C25 \quad (4)$$

The relationships of Sref/S25=Cref/C25=(1+(tpeak−25)·k) and C25/S25=Cref/Sref are obtained from Equations (1) and (2), and the relationships St/S25=Ct/C25=(1+(t−25)·k) and Ct/St=C25/S25 are obtained from Equations (3) and (4). Consequently, Ct/St=Cref/Sref, producing the relationship of Ct=St·(Cref/Sref). If here Cref/Sref=α, then Ct=St·α.

As a result, the ratio α between the bridge midpoint potential difference offset Cref and the voltage Sref across the bridge power supply terminals at the time of peak writing when at the reference temperature is calculated as α=Cref/Sref, where if this ratio α is stored in the memory 18-4 as a zero correcting factor that is unique to the angle sensor 6, then it will be possible to use the voltage St across the bridge power supply terminals at the time to calculate a temperature-corrected bridge midpoint potential difference offset Ct at the current time as Ct=St/α (wherein the ambient temperature at the time of peak writing and the current ambient temperature are not needed).

Calculating the Span Correction

In the opening information detecting portion 18, the span calculating portion 18-2 inputs, from the subtracting portion 17, the voltage S (St) across the bridge power supply terminals at the current time, to calculate a temperature-corrected span Wt at the time (Wt=a·St+b) from the inputted voltage St across the bridge power supply terminals at the current time and the span correcting factors a and b that are stored in the memory 18-4, using a and b as the slope a and the intercept b of a straight line that defines the relationship between the bridge total resistance R and the span W.

The calculation of the temperature-corrected span Wt by the span calculating portion 18-2 is based on the knowledge that the span W and the bridge total resistance R have essentially a linear relationship, mediated by the temperature T. That is, although the detailed procedures are omitted, the inventor in the present application, through repeated experimentation, and the like, discovered that the span W and the bridge total resistance R have a linear relationship, and that the differences from unit to unit in the relationships between the spans W and the bridge total resistances R appear as only translational motion, with essentially no variability in the slopes. The ability to calculate the temperature-corrected span Wt at a given time as Wt=a·St+b was derived based on this knowledge.

The relationship between bridge total resistance R and span W in an individual unit as the temperature is varied is illustrated in FIG. 5. As indicated by curves II-IV in FIG. 5, the bridge total resistance R and the span W in an individual unit have essentially a linear relationship, mediated by the temperature T, where the differences in the relationships between the spans W and the bridge total resistance R appear as translational movement, with essentially no variability in slope.

The differences between individual units in the relationships between the spans W and the bridge total resistances R appear as only translational movement, with essentially no variability in slope. Given this, in the present example, the slope a is stored in the memory 18-4 has a constant value. Moreover, at the time of peak writing, the intercept b is calculated from the span Wref, the voltage Sref across the bridge power supply terminals, and the slope a at the reference temperature, and the intercept b is stored together with the slope a in the memory 18-4 as span correcting factors that are unique to the individual angle sensor 6. Doing this enables the voltage St across the bridge power supply terminals at the current time to be used to calculate the span Wt as Wt=a·St+b (wherein the ambient temperature at the time of peak writing and the ambient temperature at the current time or not needed).

Note that while instead the span Wref, the voltage Sref across the bridge power supply terminals, and the slope a, at the reference temperature, may be stored in the memory 18-4 and the intercept b may be calculated when calculating the temperature-corrected span Wt at the current time, calculating the intercept b at the time of peak writing and storing it together with the slope a in the memory 18-4 enables calculations to be performed more easily during normal operations.

Correcting the Opening Information

The opening information correcting portion 18-3 inputs the temperature-corrected bridge midpoint potential difference offset Ct for the current time, calculated by the offset calculating portion 18-1, the temperature-corrected span Wt for the current time, calculated by the span calculating portion 18-2, and the bridge midpoint potential difference Vt, for the current time, from the subtracting portion 16, to correct the opening information obtained from the bridge midpoint potential difference Vt at the current time.

Specifically, the zero point of the bridge midpoint potential difference Vt is corrected by the temperature-corrected bridge midpoint potential difference offset Ct and the span of the bridge midpoint potential difference Vt is corrected by the temperature-corrected span Wt, to normalize the value for the bridge midpoint potential difference Vt, to obtain the angle θ in accordance with the value of the normalized bridge midpoint potential difference Vt.

The opening information obtained from the bridge midpoint potential difference Vt is subjected to temperature correction thereby through the temperature-corrected bridge midpoint potential difference offset Ct and the temperature-corrected span Wt, and thus a temperature-corrected valve position for the flow rate regulating valve 1 (the current valve opening value θpv) is outputted.

As described above, in the present example a temperature-corrected bridge midpoint potential difference offset Ct at the current time is calculated in the opening information detecting portion 18 based on the electrical potential St across the power supply terminals of the bridge circuit 65 at the current time and the zero correcting coefficient a that has been stored in the memory 18-4, and a temperature-corrected span Wt for the current time is calculated based on the electrical potential St across the power supply terminals of the bridge circuit 65 at the current time and the span correcting factors a and b that are stored in the memory 18-4, to perform temperature correction of the angle information obtained from the bridge midpoint potential difference Vt at the current time for the bridge circuit 65 based on the temperature-corrected bridge midpoint potential difference offset Ct and span Wt at the current time, thus enabling the angle information obtained from the bridge midpoint potential difference Vt in the bridge circuit 85 at the current time to be corrected for temperature, without going through temperature, thus producing the superior effects of eliminating the need for expensive equipment for a historical record and eliminating the need for excessive screening, enabling superior correction results at a low cost.

Moreover, while in the example described above both the offset and the span were corrected in the opening information detecting portion 18, the offset may be subjected to temperature correction alone, and temperature correction need not necessarily be performed for the span. That is, the structure may be such that the zero correcting factor a alone is stored in the memory 18-4, where the voltage St across the bridge power supply terminals at the current time may be multiplied by this zero correcting factor a to calculate a temperature-corrected bridge midpoint potential difference offset Ct at the current time, to perform temperature correction on the opening information obtained from the bridge midpoint potential difference Vt of the bridge circuit 65 at the current time using only the temperature-corrected bridge midpoint potential difference offset Ct.

Moreover, while in the example set forth above, the bridge midpoint electrical potentials V1 and V2 were sent to the positioner main unit 8 from the angle sensor 6 and the bridge midpoint potential difference V was calculated by the positioner main unit 8, the bridge midpoint potential difference V may be calculated by the angle sensor 6 instead, and this calculated bridge midpoint potential difference V may be sent to the positioner main unit 8.

The sending of the combination of the bridge midpoint electrical potentials V1 and V2 from the angle sensor 6 to the positioner main unit 8 essentially refers to sending of the bridge midpoint potential difference V to the positioner main unit 8. That is, it refers to the angle sensor 6 sending the bridge midpoint potential difference V to the positioner main unit 8 as the bridge midpoint electrical potentials V1 and V2. Moreover, while the valve opening value θpv of the flow rate regulating valve 1 at the current time is detected by the opening information detecting portion 18, this essentially refers to detection of the information for the relative angle between the bridge circuit 65 and the magnetic field.

Moreover, while, in the example set forth above, the voltage S across the bridge power supply terminals was used as the bridge total resistance indicating value, the sum of the bridge midpoint electrical potentials for the bridge circuit 65 may be used as the bridge total resistance indicating value instead. Moreover, a bridge total resistance calculated directly may be used as the bridge total resistance indicating value instead. Furthermore, if the bridge total resistance R can be known directly, this bridge total resistance R itself may be used as the bridge total resistance indicating value.

Figure 6:
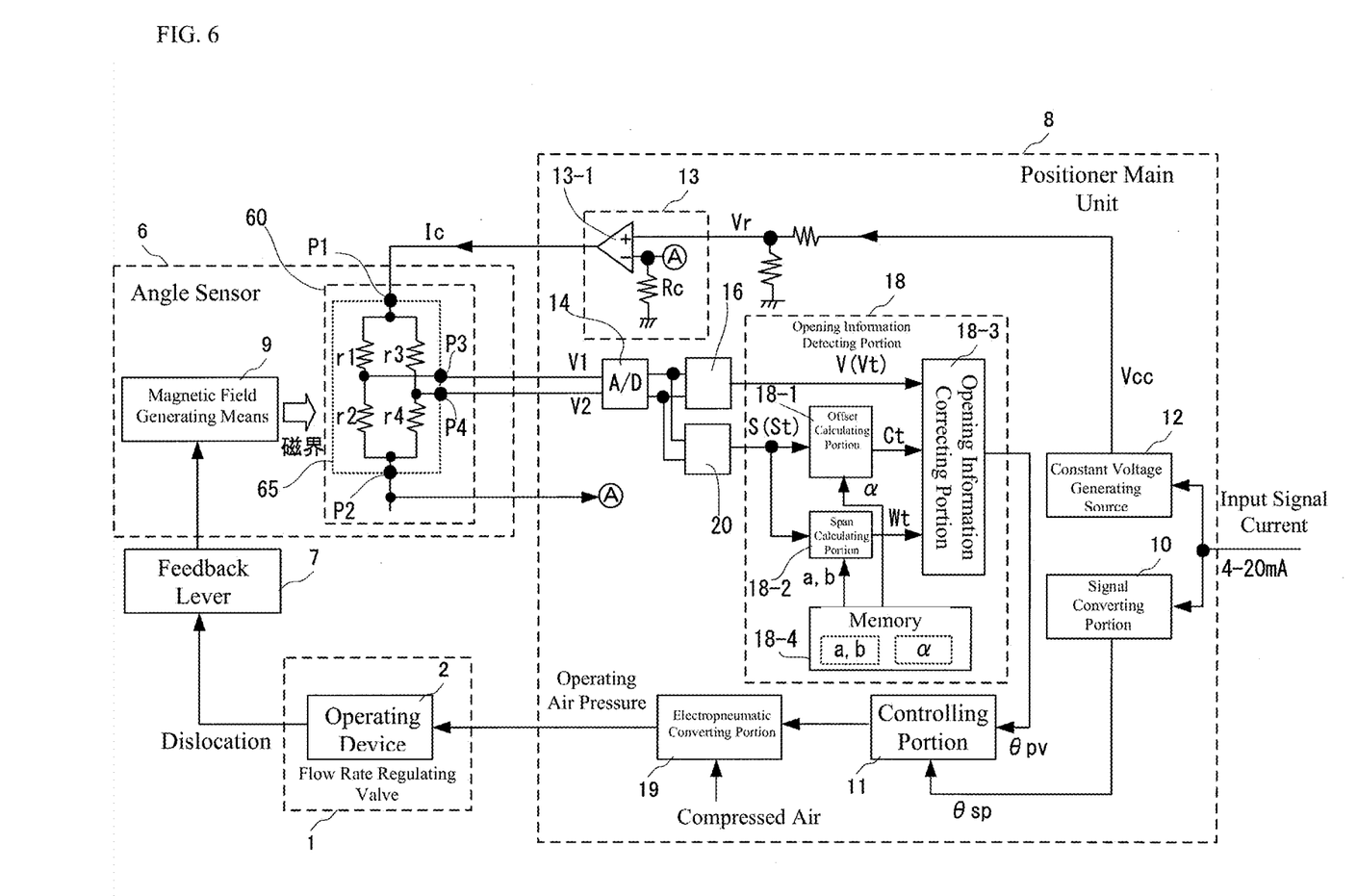
FIG. 6 is a diagram corresponding to FIG. 1 when the sum of the bridge midpoint electric potential for the bridge circuit is used as a bridge total resistance indicating value.

FIG. 6 presents a diagram corresponding to FIG. 1 when the sum of the bridge midpoint electrical potentials for the bridge circuit 65 is used as the bridge total resistance indicating value. In this case, the bridge midpoint electrical potentials V1 and V2, converted into digital signals by the A/D converter 14, are branched to an adding portion 20, where the sum of the bridge midpoint electrical potentials V1 and V2 is calculated in the adding portion 20 as a bridge midpoint electrical potential sum S. This bridge midpoint electrical potential sum S is used as the bridge total resistance indicating value, and, in the same manner as described above, the zero point correcting factor a and the span correcting factors a and b that are unique to the individual angle sensor 6 are stored in the memory 18-4, the temperature-corrected bridge midpoint potential difference offset Ct is calculated by the offset calculating portion 18-1, and the temperature-corrected span Wt is calculated by the span calculating portion 18-2.

Extended Examples

While the present disclosure has been explained above in reference to examples, the present disclosure is not limited to the examples set forth above. The structures and details in the present disclosure may be varied in a variety of ways, as can be understood by one skilled in the art, within the scope of technology in the present disclosure.

The invention claimed is:

1. An angle sensor temperature correcting device, comprising:
    a bridge circuit configured to include four magnetoresistive elements, connected in a bridge connection, and to receive a supply of a constant current across power supply terminals;
    a magnetic field generator configured to generate a magnetic field that acts on this bridge circuit, for performing temperature correction on angle information from an angle sensor that outputs a bridge midpoint potential difference for the bridge circuit as relative angle information between the bridge circuit and the magnetic field;
    a zero correcting factor storing portion configured to store, at a reference temperature, as a bridge midpoint potential difference offset, a difference from an actual value to a correct value for a relative angle between the bridge circuit and the magnetic field of the bridge midpoint potential difference, and as a bridge total resistance indicating value a value indicating the total resistance of the bridge circuit at the reference temperature, and configured to store, as a zero correcting factor, a ratio of the bridge midpoint potential difference offset and the bridge total resistance indicating value at the reference temperature; and
    a temperature correcting portion configured to perform temperature correction on angle information obtained from the bridge midpoint potential difference of the bridge circuit at a current time, based on the bridge total resistance indicating value of the bridge circuit at the current time and the zero correcting factor stored in the zero correcting factor storing portion.

2. The angle sensor temperature correcting device as set forth in claim 1, further comprising:
    a span correcting factor storing portion configured to store, as a reference temperature span, a difference between a maximum value and a minimum value of the bridge midpoint potential difference of the bridge circuit at the reference temperature, obtained by rotating the magnetic field that acts on the bridge circuit, and configured to store, as a span correcting factor, a factor calculated from the reference temperature span and the bridge total resistance indicating value at the reference temperature;
wherein:
    the temperature correcting portion configured to perform a temperature correction of the angle information obtained from the bridge midpoint potential difference of the bridge circuit at the current time based on a the bridge total resistance indicating value of the bridge circuit at the current time and a span correcting factor that is stored in the span correcting factor storing portion.

3. The angle sensor temperature correcting device as set forth in claim 2, further comprising:
the temperature correcting portion calculates a current temperature-corrected bridge midpoint potential difference offset based on the bridge total resistance indicating value of the bridge circuit at the current time and the zero correcting factor stored in the zero correcting factor storing portion, calculates a temperature-corrected span for the current time based on the bridge total resistance indicating value for the bridge circuit at the current time and the span correcting factor stored in the span correcting factor storing portion, and performs temperature correction of the angle information, obtained from the bridge midpoint potential difference of the bridge circuit at the current time, based on the current temperature-corrected bridge midpoint potential difference offset and span.

4. The angle sensor temperature correcting device as set forth in claim 1, wherein:
the bridge total resistance indicating value is a voltage across the power supply terminals of the bridge circuit.

5. The angle sensor temperature correcting device as set forth in claim 1, wherein:
the bridge total resistance indicating value is a bridge midpoint electrical potential sum for the bridge circuit.

6. The angle sensor temperature correcting device as set forth in claim 1, wherein:
the difference from the actual value to the correct value, for a relative angle between the bridge circuit and the magnetic field, of the bridge midpoint potential difference at the reference temperature is a value obtained through using a maximum value and a minimum value of the bridge midpoint potential difference of the bridge circuit at the reference temperature, obtained by rotating a magnetic field that acts on the bridge circuit.

7. The angle sensor temperature correcting device as set forth in claim 1, wherein:
the difference from the actual value to the correct value, for a relative angle between the bridge circuit and the magnetic field, of the bridge midpoint potential difference at the reference temperature is the bridge midpoint potential difference of the bridge circuit at the reference temperature when not in a magnetic field.

* * * * *